United States Patent [19]

Cummins

[11] 4,391,576

[45] Jul. 5, 1983

[54] ROTARY DRUM DOUGH DIVIDER

[75] Inventor: Donald L. Cummins, Mechanicsville, Va.

[73] Assignee: AMF Incorporated, White Plains, N.Y.

[21] Appl. No.: 334,766

[22] Filed: Dec. 28, 1981

[51] Int. Cl.³ .............................. A21C 5/04; B29C 1/00
[52] U.S. Cl. ...................................... 425/241; 425/182
[58] Field of Search ........................... 425/98, 238–241, 425/182

[56] References Cited

U.S. PATENT DOCUMENTS

| | | | |
|---|---|---|---|
| 1,171,330 | 2/1916 | Embrey | 425/239 |
| 1,954,501 | 4/1934 | Steere | 425/241 |
| 2,787,972 | 4/1957 | Vogt | 425/241 |
| 2,858,775 | 11/1958 | Marasso | 425/241 |
| 3,489,104 | 1/1970 | Wolff | 425/241 |

Primary Examiner—Willard E. Hoag
Attorney, Agent, or Firm—David E. Dougherty; Charles J. Worth

[57] ABSTRACT

A rotating drum divider and an improved assembly for use in a cylinder of the rotating drum type dough divider comprising a sleeve positioned in the cylinder forming seals on both sides of a pair of diametrically opposed guide slots connected to atmosphere and a pair of ducts communicating with the cylinder at opposite ends of the sleeve which are alternately connected to pressure and vacuum, a double acting piston having a head in each end of the cylinder and a piston rod portion extending from each head into the sleeve, and a scaling rod joining the adjacent ends of the piston rod portions together, and reciprocating to cause the rod portions and their heads to reciprocate together in the cylinder as a double ended piston.

11 Claims, 4 Drawing Figures

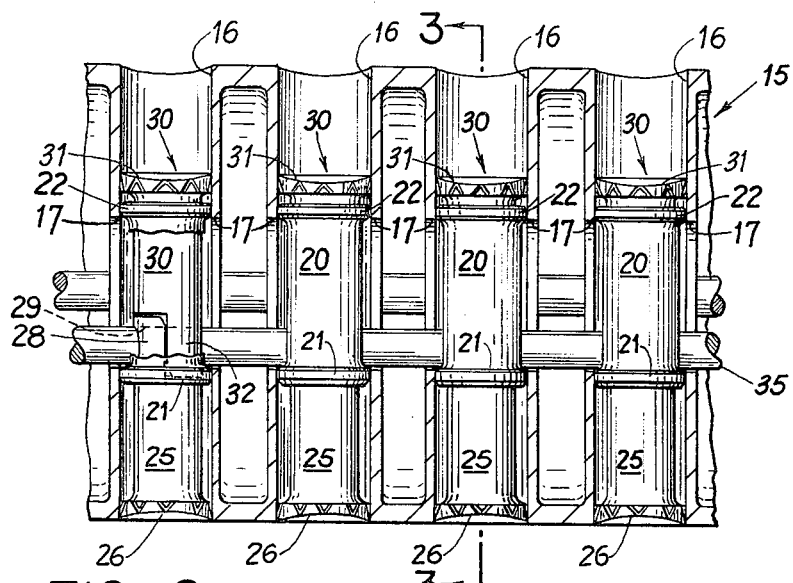
FIG. 2
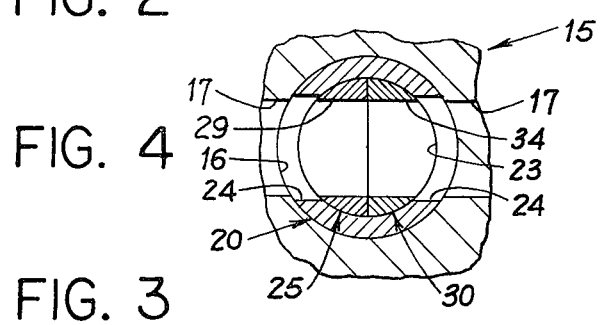
FIG. 4
FIG. 3
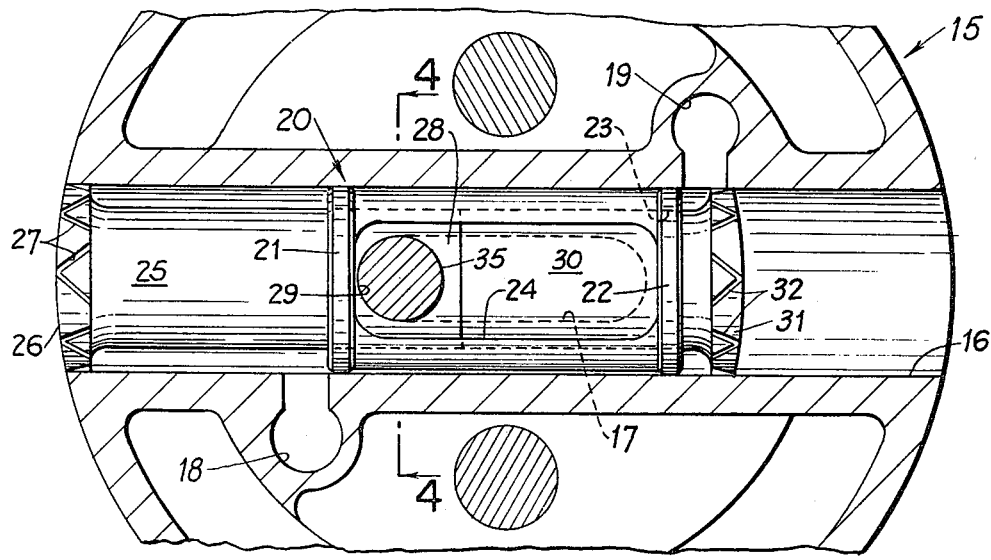

ROTARY DRUM DOUGH DIVIDER

This invention generally relates to piston means incorporated in machines for handling plastic material such as dough and, more particularly, to an improved piston assembly for a rotating drum type dough divider.

Conventionally, dough is scaled or divided into equal volumetric portions which thereafter are rolled into balls and deposited into pans by the makeup equipment as is shown, for example, in U.S. Pat. No. 2,858,775 which are granted to F. D. Marasso which is incorporated herein by reference thereto.

As is shown in the Marasso patent, the rotating scaling drum is provided with a guide slot or track which extends from one end of the drum to the other along its center of rotation and is intersected by each of a plurality of spaced parallel diametrical through bores or cylinders. A pair of ports or ducts are provided to communicate with each of the through bores or cylinders. Each of the ports or ducts is spaced on one side of the guide slot or track opposite from the other, and are alternately and oppositely connected to a source of vacuum and a source of pressure, while the guide slot or track is always open to atmosphere. To prevent loss of vacuum and or pressure, there must be a constant seal in each cylinder between the guide slot or track and each port or duct. This, in practice, has been accomplished by providing a two headed or ended piston which reciprocates in the through bore or cylinder with an annular sealing surface spaced inwardly from each of the piston heads.

By referring to FIG. 8 of the Marasso patent, it is noted that the two ended piston is of unitary construction and is provided with a pair of spaced annular sealing surfaces disposed between the heads which are at the ends of piston. To manufacture a piston of this type becomes extremely difficult particularly because of the required concentricity of the annular sealing surfaces and piston heads to prevent blowby between the guide slot or track and the ports or ducts.

Accordingly, an object of the present invention is to provide an improved piston assembly for a rotating drum type dough divider which provides improved sealing.

Another object of the present invention is to provide the foregoing piston assembly with fixed annular sealing means on each side of the guide slot of the drum which substantially isolates the guide slot from the ports or ducts.

Still, another object of the present invention, is to provide the foregoing piston assembly which normally tends to reduce the amount of dough trapped behind the piston heads.

And, still another object of the present invention, is to provide the foregoing piston assembly in which the pistons can be removed with facility for cleaning, and can be replaced without consideration of their original location.

The foregoing and other objects and advantages will appear more fully hereinafter from a consideration of the detailed description which follows, taken together with the accompanying drawings wherein a single embodiment of the invention is illustrated by way of example. It is expressly understood, however, that the drawings are for illustration purposes only and are not to be construed as defining the limits of the invention.

FIG. 2 is an enlarged fragmentary sectional view taken on line 2—2 of FIG. 1 illustrating a plurality of cylinders in the rotating drum each having a piston assembly made in accordance with the present invention.

FIG. 3 is a further enlarged sectional view taken on line 3—3 of FIG. 2.

FIG. 4 is a fragmentary sectional view taken on line 4—4 of FIG. 3, with scaling rod removed.

Figure 1:
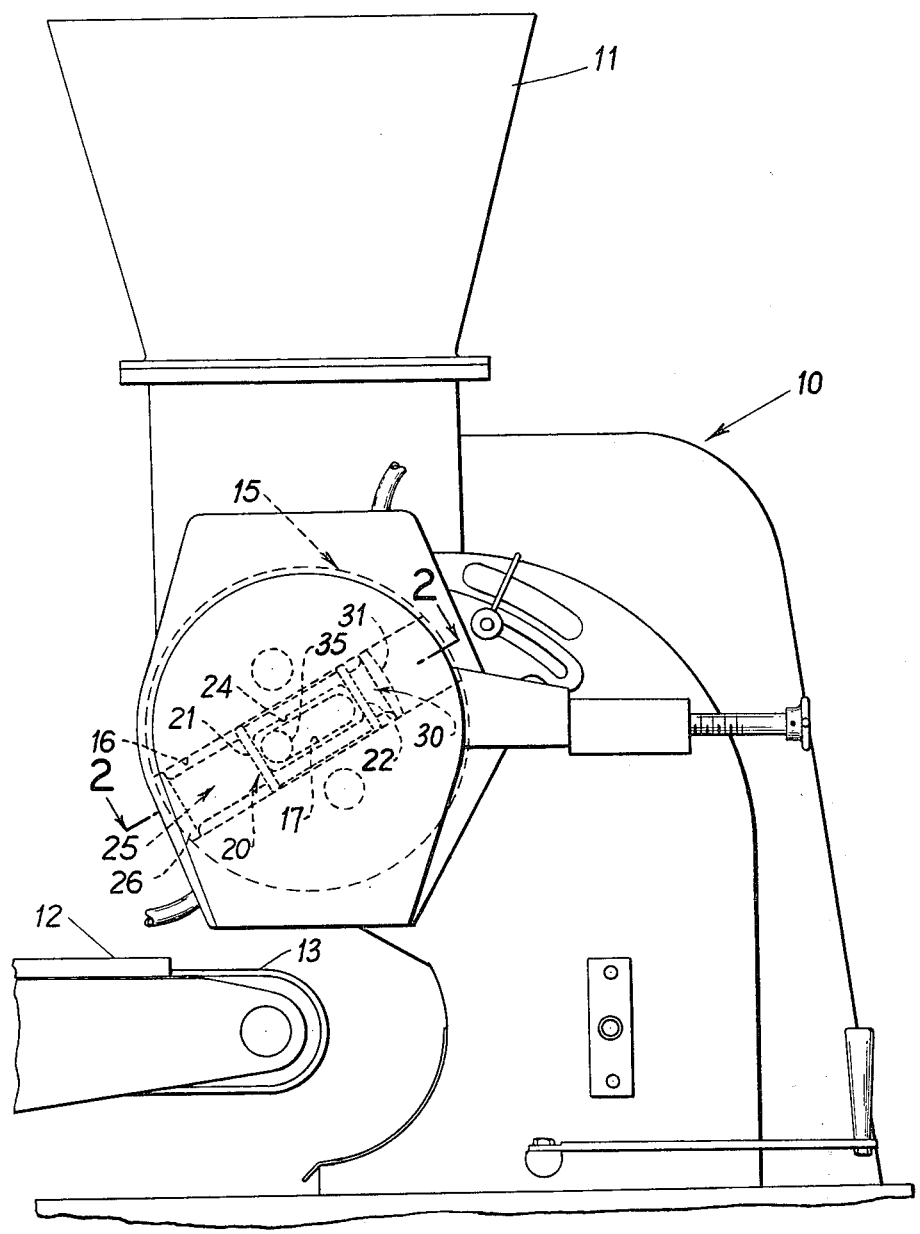
FIG. 1 is an elevational view of a dough divider which embodies the present invention.

Referring now to the drawings, and particularly to FIG. 1, a dough divider 10 is provided with a hopper 11 for the dough to be divided into volumetrically equal dough portions by the rotating drum 15 which has a plurality of parallel cylinders or diametrical through bores 16 spaced from one another between the ends of the drum (see FIG. 2), each cylinder 16 being provided with a piston assembly. The axes of the cylinders 16 are parallel to one another and as the scaling drum 15 rotates the corresponding ends of the cylinders alternately will simultaneously communicate to receive dough from the hopper 11 and to discharge the resulting dough portions on to the endless belt 13 of dough rounder means 12.

Referring more particularly to FIGS. 2 and 3, the drum 15 is provided with a guide slot or passage means intersected by all of the cylinders 16 and which extends endwise through the drum 15 to provide a pair of diametrically opposed slots 17 in the wall of each of the cylinders 16 thereby forming a reciprocating path for a piston operating shaft or scaling rod 35. The axes of elongation of the slots 17 are parallel to the axes of the cylinders 16. Therefore, the wall of each cylinder 16 is provided with a pair of diametrically opposed slots 17 which are centrally located or equi-distant from the cylinder ends. A pair of axially spaced ports or ducts 18 and 19 communicate with each of the cylinders 16, each port or duct being disposed on one side of the guide slots 17 opposite from the other. The ports or ducts 18 and 19 are appropriately adapted to be alternately connected to a source of pressure and vacuum, as will be further discussed. Inasmuch as all the cylinders 16 and piston assemblies therein are the same, only one need be described. A cylinder 16 is provided with a novel piston assembly generally comprising a double ended piston formed by a pair of pistons 25 and 30 and a sleeve member 20 which is driven or pressed into a fixed position in the cylinder 16 and is removably retained therein.

The sleeve 20 is provided with a pair of seal means 21 and 22 at its ends which prevent flow between the guide slots 17 and the ports or ducts 18 and 19. The sleeve member 20 is also provided with a through bore 23 coaxial with the axis of cylinder 16 in which it is disposed, and a pair of diametrically opposed side slots 24 which are aligned with the guide slots 17 in the cylinder wall.

A piston or piston rod 25 has a head 26 at one end with an outer surface or face which conforms to the curvature of the surface of drum 15. The periphery of the head 26 is provided with grooves 27 extending between the front and rear surfaces thereof. The opposite end of the piston 25 (the rod end) is recessed or has a cutout to provide a tailpiece 28 which is only half the width of the piston or piston rod and has a transverse hole or bore 29 therethrough. The piston 30, substantially the same as piston 25, has a similar head 31 with peripheral grooves 32 at one end, and a recess or cutout forming a tailpiece 32 provided with a transverse hole or bore 34.

The pistons 25 and 30 are inserted into opposite ends of a cylinder 16 and extend into opposite ends of the through bore 23 of the sleeve 20. The tailpieces 28 and 33 fit into the recesses or cutouts of the pistons thereby being mated together or interfitted with the holes or bores 29 and 34 aligned with one another and with the slots 24 of the sleeve 20 and guide slots 17 in the wall of the cylinder 16. The operating shaft or scaling rod 35 extends through all of the guide slots 17 of the drum 15, the slots 24 of all of the inserts or sleeves 20 and the aligned holes or bores 29 and 34 and of the pistons 25 and 30 which are disposed in each of the cylinders 16. The scaling rod or shaft 35 is reciprocated transversely along a path defined by guide slots 17 which is coincident with the axes of the cylinders 16 to cause all of the pistons 25 and 30 to reciprocate together as double headed pistons in unison within each of the cylinders 16.

The novel piston assembly also may be considered as comprising a sleeve 20 fixed centrally in the cylinder 16 and a double ended or two headed piston extending through the sleeve and being double acting in the cylinder. The sleeve 20 is provided with a pair of spaced end walls 21 and 22 engaging and forming seals with the wall of cylinder 16, a pair of diametrically opposed slots 24 extending between the end walls and adapted to be aligned with guide slots or tracks 17 in the wall of cylinder 16, and a through bore co-axial with the cylinder.

The piston extends through the sleeve 20 and is provided with a pair of heads 26 and 31 connected to opposite ends thereof and disposed in the cylinder 16 on opposite sides of the sleeve 20. The outer faces or surfaces of heads 26 and 31, which are provided with peripheral grooves 27 and 32, respectively, are curved to correspond with the curvature of the outer surface of the drum 15. The piston is divided at the center into a rod portion 25 connected to head 26 and a rod portion 30 connected to the head 31. The adjacent ends of rod portions 25 and 30, are recessed to form interfitting tail pieces 28 and 33, respectively, with respective bores or holes 29 and 34 axially aligned with each other and aligned with slots 24 of sleeve 20 and guide slots or tracks 26. The operating shaft or scaling rod 35 extends through the guide slots or tracks 17, the slots 24 of the sleeves 20 and all the pairs of aligned bores 29 and 34 thereby connecting together piston rod portions 25 and 30 disposed in the same cylinder 16. The port or duct 18 communicates with the area between end wall 21 and piston head 26, and outwardly of piston head 26 through peripheral grooves 27. The port or duct 19 communicates with the area between end wall 22 and piston head 31, and outwardly of piston head 31 through peripheral grooves 32.

Each connected pair of pistons or piston rod portions 25 and 30, with the respective heads 26 and 31 reciprocate in a cylinder 16 and emulates a two headed double acting piston. As shown in FIG. 3, the interconnected pistons or rod portions 25 and 30 are at the end of a stroke or in a terminal position with head 26 of piston or rod portion 25 fully extended at its outer head surface aligned with the periphery of the drum 15 while the head 31 or piston 30 fully retracted into the cylinder 16 forming an open chamber or pocket outwardly thereof which is charged with dough.

As drum 15 continues to rotate counterclockwise, the piston or rod portion 25 moves progressively inwardly into the cylinder 16 while the piston or rod portion 30 moves progressively toward the periphery of the drum. This movement causes the area between the head 26 and sealing end 21 of the sleeve 20 to shrink and vent through port or duct 18 which at this time is connected to vacuum. The piston head 26 moving away from the periphery of the drum 15 progressively creates an open pocket increasing in area at that end of the cylinder 16 which moves into registry with the hopper 11 to receive dough therefrom. To ensure that the bottom of the forming pockets has no voids, vacuum connected to the port or duct 18 communicates with the bottom of the pocket through the peripheral grooves 27.

Simultaneously, with movement of piston or rod portion 25, the piston or rod portion 30 moves to its other terminal position at the opposite end of the cylinder 16 which now registers with the discharge to the dough rounding means 12 and forces the scaled dough piece out of the progressively reducing pocket in front of the piston head 31. The area between the piston head 31 and the end sealing means 22 of the sleeve progressively increasing in size, is initially connected by the port or duct 19 to either atmosphere or pressure. However, near the end of the outward stroke of piston 30, the port or duct 19 must be connected to pressure which exhausts and clears the grooves 32 of any dough or oils and aids in the final removal of dough from the face of the piston head 31. When the drum has rotated 180° the terminal positions of pistons or rod portions 25 and 30 with their respective heads 26 and 31 will be reversed from the terminal positions shown in FIG. 3.

It should be noted that the sealing rod or shaft 35 joins each of the pairs of pistons or rod portions 25 and 30 together and by merely withdrawing the scaling rod from the drum 15 each piston or rod portion and its head of each pair of pistons or rod portions 25 and 30 is free to be removed by hand without disturbing the other piston or rod portion, or the sleeve 20 in the cylinder 16.

It should be readily understood that the end walls 21 and 22 of a sleeve 29 form positive seals with the wall of a cylinder 16 between the guide slots 17 and the ports or ducts 18 and 19. These seals are fixed in position in the cylinder 16 and are not subject to wear unlike the traveling seal means of a unitary double acting piston such as shown in the Marasso U.S. Pat. No. 2,858,775. The running seal means between the guide slots 17 and ports or ducts 18 and 19 are formed by the interfaces formed by the surface of the through bore 23 of the sleeve 20 and the surfaces of pistons or rod portions 25 and 30 which are of a smaller diameter than the cylinder 16 and are of greater axial length than the width of the end walls 21 and 22.

The end walls 21 and 22 being fixed against movement can never partially cover or restrict the ports 18 and 19. This type of construction also provides a force advantage which aids in reciprocation of the pistons or rod portions 25 and 30 with the port 18 providing a vacuum to the area behind the piston head 26 as its volume thereat decreases and pressure as its volume increases. Similarly, the port 19 provides a vacuum to the area behind the piston head 31 as its volume decreases and pressure as its volume increases. These positive and negative pressures act in the direction of movement on the piston heads 26 and 31 thereby reducing the shear load on the scaling rod 35 for reciprocating the pistons or rod portions 25 and 30.

All of the pistons 25 and 30 with their respective heads 26 and 31 are the same shape and size, and after removal of the pistons for cleaning, they may be replaced without regard for their original location.

Although but a single embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. A piston assembly for a transverse through bore cylinder with diametrically opposed slots and a pair of ports each spaced outwardly from opposite ends of the slots in the drum of a rotary drum dough divider, comprising:

a sleeve removably fixed against movement relative a wall of said cylinder and equally spaced from the ends of said cylinder;

said sleeve having a pair of end walls engaging and forming with the wall of said cylinder a pair of axially spaced sealed interfaces each between opposite ends of the slots and a different one of the pair of ports;

a double ended piston having a rod extending through said sleeve and a head connected to each end of said rod to reciprocate in said cylinder between two terminal positions with one of said heads being flush with the surface of the drum in one terminal position and the other of said heads being flush with the surface of the drum in the other terminal position;

said piston rod being formed by two rod portions each being connected at one end to a different one of said heads; and the adjacent ends of said rod portions being interfitted and connected together by means extending through said slots and being movable axially in said cylinder to reciprocate said piston.

2. The piston assembly in accordance with claim 1, and each head having a curved outer face conforming to the curvature of the drum.

3. The piston assembly in accordance with claim 2, and each head forming an open pocket as it moves away from the end of the cylinder for receiving a predetermined amount of dough and for discharging said dough from said pocket as said head moves toward the end of said cylinder.

4. The piston assembly in accordance with claim 3, and the area between the end of said sleeve and the piston head adjacent thereto being connected to vacuum as said head moves toward said sleeve and to pressure as said head moves toward the cylinder end thereby providing forces to assist said piston to reciprocate.

5. The piston assembly in accordance with claim 4, and each head having axially extending peripheral grooves connecting vacuum to the bottom of a pocket being formed to prevent voids and connecting pressure to the front of the head moving toward the cylinder end thereby aiding in discharging dough.

6. Apparatus for providing volumetrically equal dough pieces comprising:

a hopper for dough to be divided and a discharge for volumetrically equal dough pieces;

a rotating drum having a plurality of transverse through bores forming parallel cylinders providing pockets at one of their corresponding ends receiving dough from said hopper and simultaneously discharging volumetrically equal dough pieces from their other corresponding ends;

a scaling rod extending axially in said drum and transversely through all of said cylinders;

a path along the center of rotation of said drum providing a pair of diametrically opposed guide slots in the wall of each of said cylinders for said scaling rod;

a plurality of sleeves each removably fixed in a different one of said cylinders equally spaced from the ends thereof;

each of said sleeves having a pair of axially spaced end walls engaging and forming sealed interfaces with the wall of a cylinder at opposite ends of a pair of guide slots, and a pair of diametrically opposed slots between said end walls being aligned with said guide slots;

means communicating with said cylinders at opposite ends of said sleeves alternately and oppositely providing pressure and vacuum;

a plurality of pistons each having a rod extending axially through a different one of said sleeves and having a head connected to each end of said rod;

said scaling rod engaging said piston rods and causing said pistons to reciprocate in unison between a first terminal position in which one of the corresponding heads of said pistons are flush with said drum and a second terminal position in which the other of the corresponding heads are flush with said drum.

7. The apparatus in accordance with claim 6, and each of said piston rods being formed by two rod portions each being connected at one end to a different one of said heads; and the adjacent ends of said rod portions being interfitted and connected together by said scaling rod.

8. The apparatus in accordance with claim 7, and each of said heads having a curved outer face conforming to the curvature of the drum.

9. The piston assembly in accordance with claim 8, and each of said heads forming an open pocket as it moves away from the end of a cylinder for receiving a predetermined amount of dough and for discharging said dough from said pocket as said head moves toward the end of said cylinder.

10. The apparatus in accordance with claim 9, and the area between the end of each of said sleeves and the piston head adjacent thereto being connected to vacuum as said head moves toward said sleeve and to pressure as said head moves toward the cylinder end thereby providing forces to assist said piston to reciprocate.

11. The apparatus in accordance with claim 10, and each of said heads having axially extending peripheral grooves connecting vacuum to the bottom of a pocket being formed to prevent voids and connecting pressure to the front of the head moving toward the cylinder end thereby aiding in discharging dough.

* * * * *